INVENTOR.
HILLEL WEINSTEIN
BY
Carl V. Olson
ATTORNEY

INVENTOR.
HILLEL WEINSTEIN
BY
Carl V. Olson
ATTORNEY

INVENTOR.
HILLEL WEINSTEIN
BY Carl V. Olson
ATTORNEY

Aug. 29, 1967 H. WEINSTEIN 3,339,188

SERIAL MEMORY OF ANISOTROPIC MAGNETOSTRICTIVE MATERIAL ACCESSED BY STRESS WAVE

Filed July 2, 1963 4 Sheets-Sheet 4

INVENTOR.
HILLEL WEINSTEIN

BY Carl V. Olson

ATTORNEY

United States Patent Office 3,339,188

Patented Aug. 29, 1967

3,339,188

SERIAL MEMORY OF ANISOTROPIC MAGNETOSTRICTIVE MATERIAL ACCESSED BY STRESS WAVE

Hillel Weinstein, New Brunswick, N.J., assignor to Radio Corporation of America, a corporation of Delaware Filed July 2, 1963, Ser. No. 292,309
8 Claims. (Cl. 340—174)

This invention relates to information storage systems, and particularly to memories in which access to storage locations is accomplished by means of a stress wave propagated through a magnetic material.

It is among the objects of this invention to provide: an improved memory in which a large number of information bits may be stored by means of relatively simple and inexpensive apparatus, an improved memory in which the writing and reading of information is controlled solely by electrical signals, an improved memory in which the stored information can be read out destructively or non-destructively, and an improved memory in which the memory locations can be addressed in serial groups.

According to a specific example of the invention, there is provided an elongated cylindrical anisotropic magnetic element having information bit storage locations along its length. The magnetic element has an easy axis in the transverse circumferential direction and a hard axis in the longitudinal axial direction. Means are provided to propagate a mechanical sonic stress wave along the magnetic element in the performance of writing information into said storage locations and in the performance of reading information from said storage locations. A magnetic bias is supplied to the magnetic element in the longitudinal axial direction. Write means are synchronized with the time position of the stress wave to apply information bit signals to a conductor extending through the interior of the cylindrical magnetic element to store information in the storage locations. Read means are synchronized with the time position of said stress wave to sense stored information signals induced on the conductor from the storage locations. The magnetic bias is removed during reading if it is desired to prevent destruction of the stored information. A large number of similar magnetic elements may be selectively operated from the same read and write control circuits.

Figure 1:
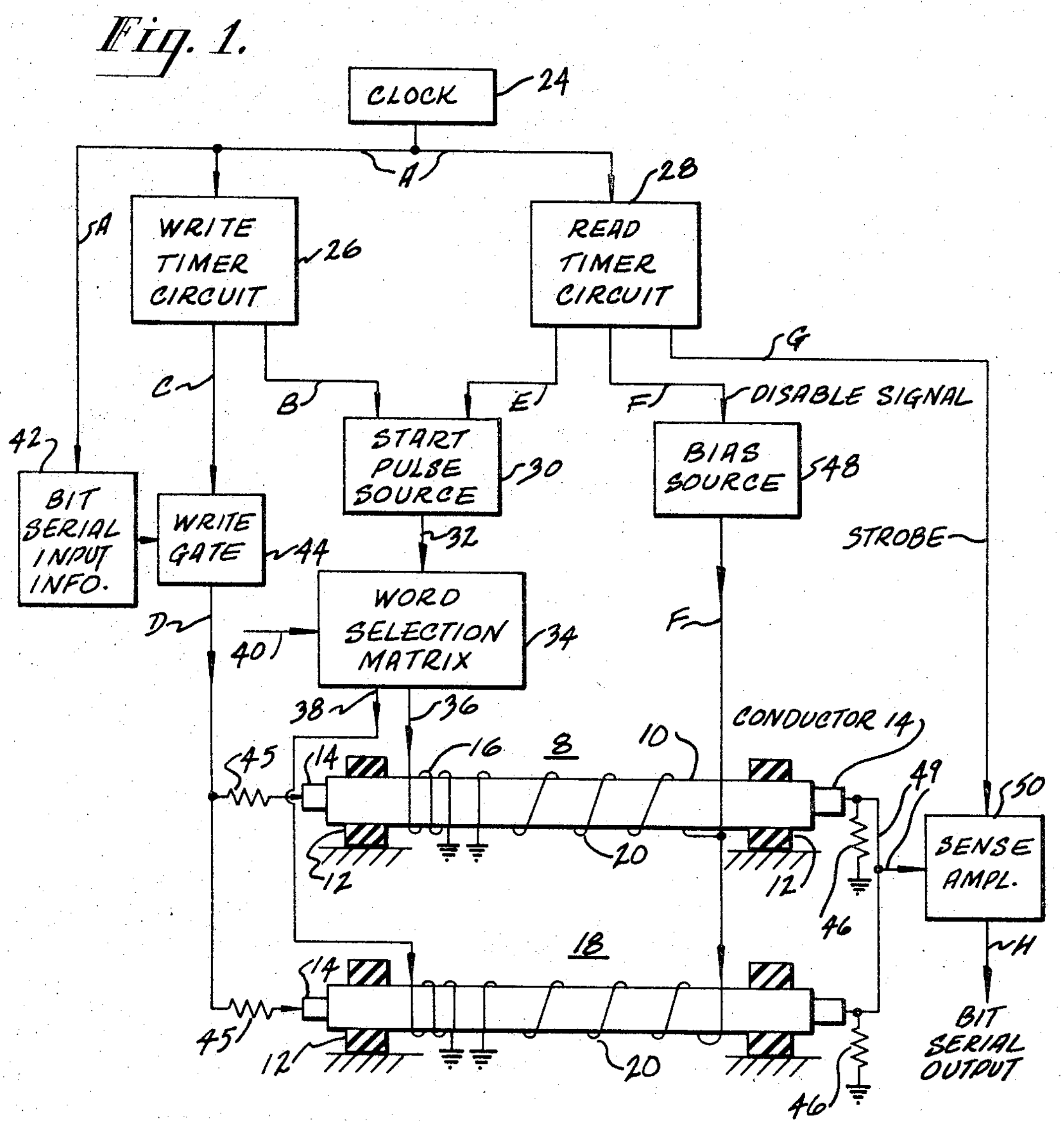
FIG. 1 is a diagram of a magnetic memory constructed according to the teachings of the invention.

Referring in greater detail to FIG. 1 there is shown an elongated cylindrical anisotropic magnetostrictive magnetic element 10 having its ends supported by vibration absorbers 12. The absorbers 12 may be of any known suitable material such as neoprene. An electrical conductor 14 extends axially through the interior of the elongated cylindrical magnetic element 10. The conductor 14 may, for example, be made of beryllium copper having a diameter of about five milli-inches. The anisotropic element 10 is preferably a thin magnetic film which may be deposited by any suitable method to a thickness of about one micron directly on the conductor 14. Alternatively, the cylindrical magnetic element 10 may be formed on a suitable cylindrical substrate through which the conductor 14 passes, or a mechanically-suitable insulating material may be interposed between the conductor 14 and the magnetic element 10. According to a further alternative, the anisotropic and magnetostrictive qualities of the element 10 may be provided in respective concentric cylinders of different materials.

Figure 2:
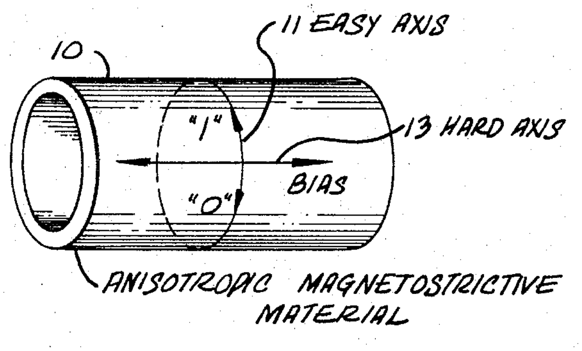
FIG. 2 is a diagram showing the easy axis and hard axis directions in the elongated magnetic elements included in FIG. 1.

The magnetic element 10 is formed of a material which exhibits anisotropic magnetic characteristics. A suitable material is Permalloy magnetic material having the proportions of 70 percent nickel and 30 percent iron. The cylindrical magnetic element 10 is preferably formed, as illustrated in FIG. 2, to have an easy axis of magnetization in circumferential circles transversely of the axis of the elongated element 10, and to have a hard axis of magnetization in the longitudinal direction. The desired directions of easy and hard axes may be established by plating or otherwise depositing the magnetic material on the conductor 14 in the presence of a magnetic field, or by any other known method.

The use of Permalloy magnetic material for the cylindrical magnetic element 10 is advantageous because the material also possesses desirable magnetostrictive characteristics. Transducer means, such as a solenoid 16, is positioned at one end of the magnetic element 10 for magnetostrictively initiating a sonic stress wave which is propagated along the magnetic element 10 and is absorbed to prevent reflections, at the terminal absorbers 12. An electrical pulse applied to the solenoid 16 generates a longitudinal mode stress wave in the magnetic element 10 by virtue of the magnetostrictive characteristic of the Permalloy magnetic element 10.

Other known transducer arrangements may be employed. Known transducers for imparting a torsional-mode sonic wave in the magnetic element 10 have advantages and may be employed.

Means to establish a longitudinal axial magnetic field bias in the magnetic element 10 is provided by a solenoid 20 wound around the outside of the element 10. In some applications it may be desirable to employ a permanent magnet (not shown) for the purpose of generating the longitudinal magnetic bias, in place of the electromagnetic arrangement which includes the solenoid 20. The electromagnetic assembly 8, which has thus far been described, may be duplicated a considerable number of times as is illustrated by the presence in the drawing of another similar assembly 18. Each of the assemblies 8, 18 may be used for the storage of a different information work. Each word may include a number of information bits.

The electronic circuitry for controlling the storage and retrieval of information includes a master clock 24 which supplies clock pulses to a write timer circuit 26, a read timer circuit 28, and an information input circuit 42 over the leads A. A common ground return (not shown) may be provided for each of the circuits used in writing and reading information. An output from the write timer circuit 26 on lead B is applied to a start pulse source 30 having an output over lead 32 to a word selection matrix 34. The matrix 34 directs an output pulse on one or the other of the output leads 36 and 38 in accordance with the word addressing information supplied thereto over line 40. If the pulse appears on output lead 36, it is directed to the transducer 16 to cause the magnetostrictive generation of a sonic wave which is propagated axially along the cylindrical magnetic element 10 of the magnetic word assembly 8. If the output pulse is on lead 38, the sonic wave is generated in the other magnetic word assembly 18.

Bit serial digital information synchronized by the clock 24 is supplied from a source 42 to an input of a write gate 44. The write gate 44 is enabled by a signal over lead C from the write timer circuit 26 to cause the application over lead D of the input information to and through isolating resistors 45 and the conductors 14 in both of magnetic assemblies 8 and 18. The conductors 14 are provided with terminating resistors 46 which provide current return paths for currents supplied to conductors 14.

The read timer circuit 28 supplies an output over lead E to the start pulse source 30 for initiating a sonic wave in the one of the magnetic assemblies determined by the word selection matrix. The sonic wave generated in response to the read timer circuit 28 is like the sonic pulse initiated in response to the write timer 26. The output on lead F of the read timer circuit 28 controls the application of a bias current from source 48 to the solenoids 20 in the magnetic assemblies 8 and 18. The ends of conductors 14 are connected over lead 49 to a sense amplifier 50. The output on lead G from the read timer circuit 28 is applied as a strobe or activating pulse to the sense amplifier 50 to permit the output of the sense amplifier over the line H to be free of unwanted noise in the intervals between the sensing of information bits.

Figure 3A:
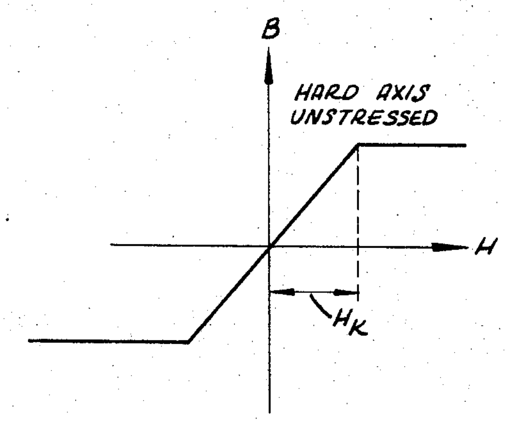
FIGS. 3A through 3D are B–H curves which will be referred to in describing the operation of the invention.
Figure 3C:
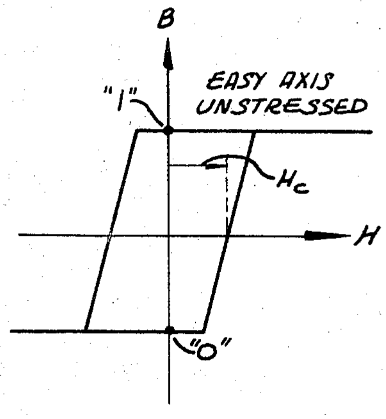
Figure 3B:
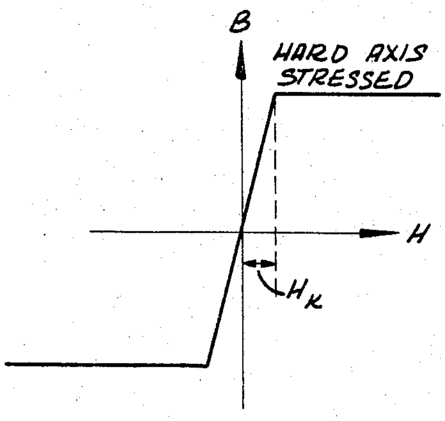
Figure 3D:
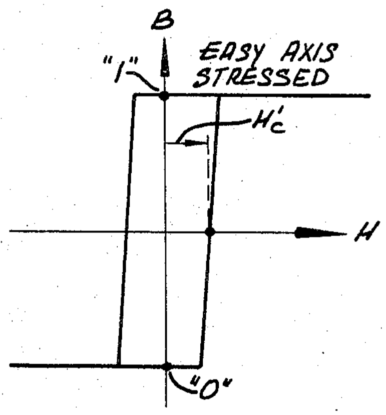
Figure 4:
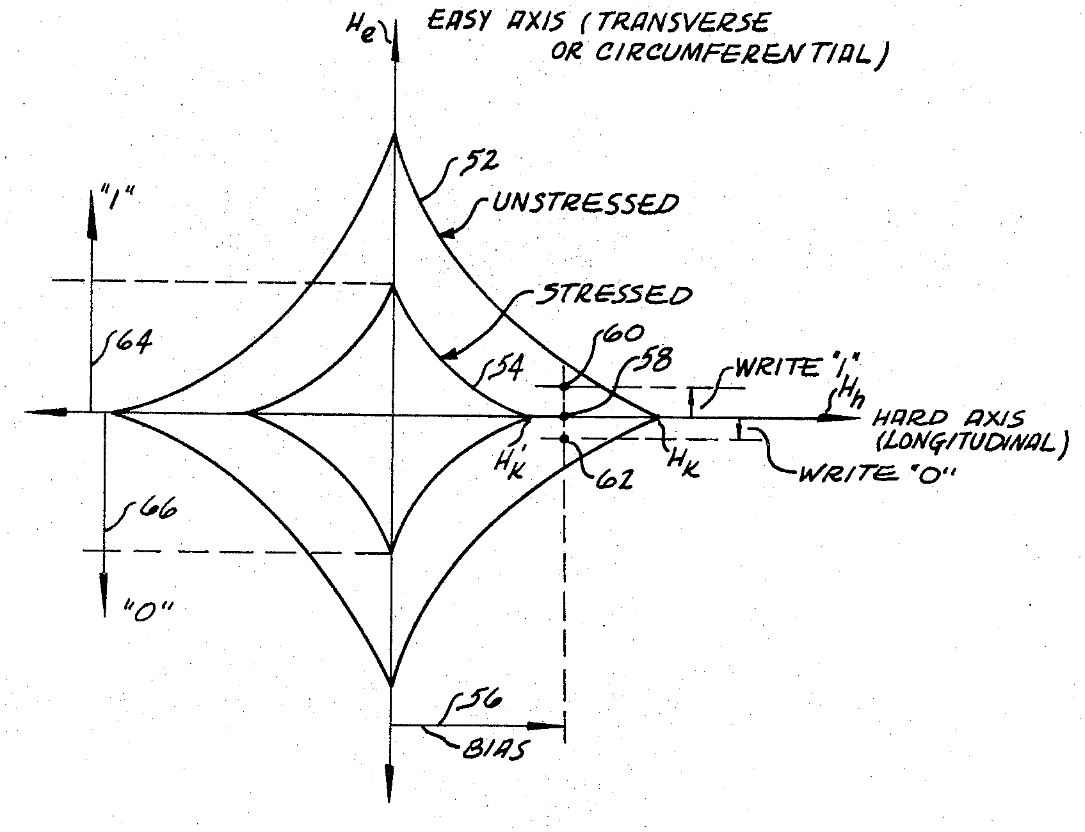
FIG. 4 is a diagram illustrating rotational switching threshold characteristics of an anisotropic magnetic element under unstressed and stressed conditions.

Reference will now be made to FIGS. 3 and 4 for a description of the magnetic characteristics of the cylindrical magnetic element 10, and for a description of the principles underlying operation of the memory of FIG. 1. An anisotropic material has different B–H characteristics in the hard axis direction as compared with the easy axis direction. The B–H characteristics also depend on whether or not the material is under a mechanical stress. These different characteristics are illustrated in FIGS. 3A through 3D wherein charts of flux density B vs. magnetizing force H are plotted for the four conditions. The amount of magnetizing force H which is just sufficient to provide saturation magnetization flux in a hard axis direction is designated $H_k$. The value of $H_k$ in FIG. 3A for the unstressed condition is considerably larger than the value of $H_k$ in FIG. 3B for the stressed condition. The decrease in the value of $H_k$ when the material is under stress is utilized for the purpose of selectively addressing information bit storage locations along the length of the cylindrical anisotropic magnetic element 10 in FIG. 1.

FIG. 4 is a threshold chart illustrating the magnetizing forces $H_e$ and $H_h$ in the easy and hard directions which must be exceeded before flux will rotationally switch from an easy axis direction to a hard axis direction. The astroid 52 shows the rotational switching threshold of a material when unstressed, and the astroid 54 shows the rotational switching threshold of the material when stressed. There is no complete rotational switching of flux from an easy direction to a hard direction unless the resultant of $H_e$ and $H_h$ magnetizing forces extend outside the astroid corresponding with the stress condition.

If, when the material is unstressed, the magnetizing force $H_h$ in the hard axis direction exceeds the value $H_k$ of magnetizing force, the flux, which prefers to lie along the easy axis, will be switched or rotated to a direction along the hard axis. Any magnetizing force less than $H_k$ is insufficient to switch or rotate the flux completely to the hard axis direction. However, if the magnetic material is understress, a magnetizing force in the hard axis direction equal to or greater than $H'_k$ is sufficient to switch or rotate all of the flux into the hard axis direction.

A magnetizing force bias 56 is applied in the longitudinal hard axis direction in an amplitude to fall between the values of magnetizing force $H'_k$ (stressed) and $H_k$ (unstressed). The bias magnetizing force 56 is supplied to the magnetic element 10 by means of the solenoid 20 and the bias source 48. The bias magnetizing force 56 establishes an operating point 58 at which the flux in the easy direction can be switched to the opposite easy direction by a write signal solely if and when the magnetic material is under stress. If the material is under stress, a small write "1" magnetizing force in the easy direction causes the operating point to move to point 60 from which the flux will switch to the upward easy direction when the stress of the material is removed. Similarly, a small write "0" pulse in the opposite direction moves the operating point to a point 62 from which the flux will switch to the downward easy direction when the stress of the material is removed.

The write "1" and write "0" signals have no lasting effect on the flux in the easy direction when the magnetic material is unstressed because the operating points 60 and 62 are inside the area bounded by the astroid 52.

The use of magnetic bias 56 in the hard axis direction permits the storage of information in response to very small amplitude write "1" and write "0" signals. However, the magnetic bias can be omitted if the write "1" and write "0" signals have the relatively large amplitudes designated 64 and 66, respectively.

The operation of the memory system of FIG. 1 will now be described with references to the timing relationship illustrated in FIG. 5. The clock pulse source 24 supplies clock pulses as shown by waveform A of FIG. 5 to the write timer circuit 26. The write timer circuit 26 supplies the write pulse B of FIG. 5 to the start pulse source 30 which supplies a pulse through the word selection matrix 34 to the transducer 16 of a selected one of the magnetic assemblies 8, 18. It will be assumed that the selection signal on input 40 of the word selection matrix 34 causes the pulse to be directed solely through the lead 36 to the transducer 16 of the magnetic assembly 8. The pulse applied to the transducer means 16 causes a mechanical sonic stress wave to be propagated along the cylindrical anisotropic magnetostrictive element 10.

Figure 5:
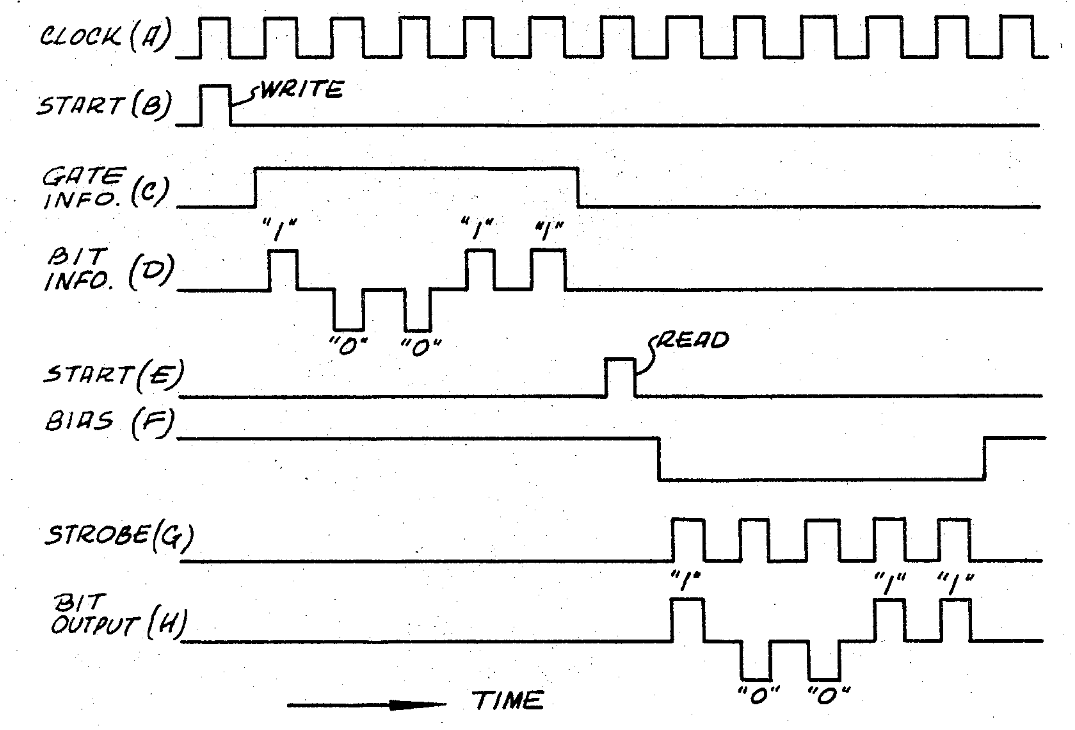
FIG. 5 is a chart of signal timing relationships in the memory system of FIG. 1.

The write timer circuit 26 then supplies a gating signal shown by waveform C of FIG. 5 to the write gate 46 to enable the gate and permit the clock-synchronized bit serial input information as shown by waveform D of FIG. 5 to be applied over line D to conductors 14 of both of the magnetic assemblies 8 and 18. A bias is normally supplied from source 48 to the solenoid 20 to bias the magnetic element 10 the amount 56 shown in FIG. 4 in the longitudinal, hard axis direction.

In the absence of a stress wave in the magnetic element 10, there is residual flux existing in one or the other of the circumferential easy axis directions at all points along the magnetic element 10. But, at a point along the length of magnetic element 10 where the propagated stress wave exists, the flux is saturated in the longitudinal hard axis direction determined by the longitudinal bias established by a steady direct current flowing through the solenoid 20. At any instant during the propagation of the sonic wave along the magnetic element 10, there is simultaneously present one of the input information bit signals on the conductor 14 which causes a corresponding circumferential flux in an easy axis direction determined by the polarity of the electrical information signal. When the sonic wave passes the point being considered, the flux must return to one of the circumferential easy axis directions. The flux returns to the easy axis direction determined by the polarity of the information bit signal on the conductor 14. It can be seen by reference to FIG. 4 that very small amplitude write "1" and write "0" are sufficient for determining which one of the easy axis directions the flux will return to after the stress wave passes on. The flux then remains in the easy axis direction and stores the information indefinitely.

The sonic wave is propagated along the magnetic element 10 at a speed of about one inch in five microseconds. This speed is slow compared with the almost instantaneous speed at which electrical information signals from source 42 pass through the conductor 14. The bit serial input information is timed so that the stream of individual information pulses (FIG. 5D) occur sequentially during the time period that a sonic wave is propagated through the central information storage region of the magnetic element 10. The sonic pulse, as it propagates down the magnetic element 10, causes the magnetic storage, in sequence, of the sequentially appearing information bit signals. In this manner, the bit serial input information pulses are distributed along, and stored magnetically in, discrete information bit storage locations along the length of the magnetic element 10.

The manner in which information bits are read into a memory including a cylindrical magnetic element 10 of anisotropic material has been described. The phenomenon relied on is a change in $H_k$ with stress. It is also possible to use a magnetic element 10 which is made of square loop isotropic material rather than anisotropic material. In this case, the phenomenon relied on is a change in coercive force $H_c$ with stress. This change of $H_c$ with stress is illustrated by the unstressed $H_c$ in FIG. 3C and the smaller stressed $H'_c$ in FIG. 3D. A write "1" or a write "0" magnetizing force having an amplitude equal to $H_c$, or slightly less, will switch flux and store the information only if the material is stressed. The amplitudes of write "1" and write "0" signals must be accurately controlled and must be relatively large. The use of an anisotropic magnetic element 10 is preferred because $H_k$ changes more with stress than does $H_c$ so that write signal amplitudes need not be so accurately controlled. Also, a small write signal serves to determine which easy axis direction the flux will relax to after leaving the hard axis direction.

When it is desired to read out the information previously stored in the magnetic assembly 8, the read timer circuit 28 supplies a read pulse E of FIG. 5 to the start pulse source 30 which is applied through the word selection matrix 34 to the transducer 16 to initiate a sonic wave which is propagated along the magnetic element 10. If it is desired to read the stored information nondestructively, the read timer circuit 28 supplies a disabling signal as shown by waveform F of FIG. 5, to the bias source 48 to remove the bias current from the solenoid 20. When the longitudinal bias is thus removed, there is no magnetizing force tending to switch the flux in the element 10 from circumferential easy axis directions to the longitudinal hard axis direction. Therefore, the stored information is not destroyed in the process of reading out the information, which is accomplished in the manner to be described.

During the reading operation, the read timer circuit 28 supplies strobe pulses according to waveform G of FIG. 5 to the sense amplifier 50. The strobe signals activate the sense amplifier in synchronism with the clock 24 so that the sense amplifier responds in sequence to signals induced on the conductor 14 as the sonic wave passes through the discrete information bit storage locations along the length of the element 10.

When the stressed wave passes through an information bit storage location where the flux is in one or the other of the circumferential easy axis directions, the stress wave changes the B–H characteristic from that shown in FIG. 3C to that shown in FIG. 3D. The stress wave causes a momentary increase in the flux in the stored direction as illustrated by the larger residual flux amplitude shown in FIG. 3D. This momentary change in flux induces a corresponding electrical signal in the conductor 14 which is sensed by the sense amplifier 15 to provide an ouput signal corresponding to the information bit stored in the bit location.

The sense signal generated as described may be augmented or replaced by a sense signal generated as the result of magnetostrictive action. When the stress wave passes through an information bit storage location, it causes a momentary change in the permeability of the magnetic material, as represented by the steeper slope of the B–H characteristic of FIG. 3D as compared with the unstressed B–H characteristic of FIG. 3C. The change in permeability of the magnetic material causes the inducing of a signal on the conductor 14 which has a polarity determined by the direction of the information storing flux along the circumferential easy axis. The sense signal thus resulting from the magnetostrictive phenomenon provides bipolar output sense signals.

When the sonic stress wave is propagated along the magnetic memory element 10 in the performance of a reading operation, the sonic wave passes through the information bit storage locations in sequence and causes corresponding information sense signals to be induced on the conductor 14 in the same sequence. The stored information bits are provided at the output of the sense amplifier in bit serial form in the same order in which they are stored along the magnetic element 10.

The memory described is one wherein information bit storage locations are accessed by a sonic wave propagated along the magnetic element. The magnetic material and the electrical signals employed permit easy axis magnetic changes in the magnetic element 10 solely at a point which is under stress by the passage therethrough of the sonic stress wave. The arrangement is one wherein a large quantity of information can be stored by means of relatively simple and inexpensive equipment. The system of FIG. 1 is intended to illustrate how the electronic circuitry shown can serve for accessing a large number of word locations each constituted by a corresponding large number of magnetic assemblies of which only two, 8 and 18, are included in the drawing. The information bits of each selected word are stored and retrieved in a bit serial manner.

What is claimed is:

1. The combination of
an elongated anisotropic magnetic element providing information bit storage locations along its length, the magnetic element having a transverse easy axis direction and a longitudinal hard axis direction,
means to propagate a stress wave along said magnetic element,
means synchronized with the time position of said stress wave to apply information bit magnetic field pulses to said magnetic element in an easy axis direction, and
means to sense magnetic field changes in the easy axis direction due to the presence of stored information in the successive storage locations of the magnetic element during the subsequent propagation of a mechanical sonic wave along said magnetic element.

2. The combination of
an elongated anisotropic magnetic element providing information bit storage locations along its length, the magnetic element having an easy axis direction and a hard axis direction,
means to propagate a stress wave along said magnetic element,
means to apply a magnetic bias to said element in the hard axis direction,
means synchonized with the time position of said stress wave to apply information bit magnetic field pulses to said magnetic element in an easy axis direction, and
means to sense magnetic field changes in the easy axis direction due to the presence of stored information in the successive storage locations of the magnetic element during the subsequent propagation of a mechanical sonic wave along said magnetic element.

3. The combination of
an elongated cylindrical anisotropic magnetic element providing information bit storage locations along its length, the magnetic element having an easy axis in the transverse circumferential direction and a hard axis in the longitudinal axial direction,
means to propagate a stress wave along said magnetic element,
means synchronized with the time position of said stress wave to apply information bit magnetic field pulses in one or the other of the transverse easy axis directions to said magnetic element, and
means to sense magnetic field changes in the transverse easy axis direction due to the presence of stored information in the successive storage locations of the magnetic element during the subsequent propagation of a mechanical sonic wave along said magnetic element.

4. The combination of
an elongated cylindrical anisotropic magnetic element providing information bit storage locations along its length, the magnetic element having an easy axis in the transverse circumferential direction and a hard axis in the longitudinal axial direction,
means to propagate a mechanical sonic stress wave along said magnetic element,
means to apply a magnetic bias to said element in the hard axis longitudinal direction,
means synchronized with the time position of said stress wave to apply information bit magnetic field pulses in one or the other of the transverse easy axis directions to said magnetic element, and
means to sense magnetic field changes in the transverse easy axis direction due to the presence of stored information in the successive storage locations of the magnetic element during the subsequent propagation of a mechanical sonic wave along said magnetic element.

5. The combination of
an elongated cylindrical anisotropic magnetic element providing information bit storage locations along its length, the magnetic element having an easy axis in the transverse circumferential direction and a hard axis in the longitudinal axial direction,
means to propagate a mechanical sonic stress wave along said magnetic element,
a conductor inside said cylindrical magnetic element,
means to apply bias current to said conductor,
means synchronized with the time position of said stress wave to apply information bit signals to said conductor to store information in said storage locations, and
means coupled to said conductor to sense stored information in the successive storage locations of the magnetic element during the subsequent propagation of a mechanical sonic wave along said magnetic element.

6. The combination of
an elongated cylindrical anisotropic magnetic element providing information bit storage locations along its length, the magnetic element having an easy axis in the transverse circumferential direction and a hard axis in the longitudinal axial direction,
means to propagate a mechanical sonic stress wave along said magnetic element in the performance of writing information into said storage locations and reading information from said storage locations,
a conductor inside said cylindrical magnetic element,
write means synchronized with the time position of said stress wave to apply information bit signals to said conductor to store information in said storage locations, and
read means synchronized with the time position of said stress wave to sense stored information signals induced on said conductor from said storage locations.

7. The combination of
an elongated cylindrical anisotropic magnetic element providing information bit storage locations along its length, the magnetic element having an easy axis in the transverse circumferential direction and a hard axis in the longitudinal axial direction,
means to apply a longitudinal magnetic bias to said magnetic element,
means to propagate a mechanical sonic stress wave along said magnetic element in the performance of writing information into said storage locations and in the performance of reading information from said storage locations,
a conductor inside said cylindrical magnetic element,
write means synchronized with the time position of said stress wave to apply information bit signals to said conductor to store information in said storage locations,
read means synchronized with the time position of said stress wave to sense stored information signals induced on said conductor from said storage locations, and
means to remove said magnetic bias during reading to prevent destruction of the stored information.

8. The combination of
an elongated cylindrical anisotropic magnetic element providing information bit storage location regions along its length, the magnetic element having an easy axis in the transverse circumferential direction and a hard axis in the longitudinal axial direction,
bias means including a solenoid surrounding said cylindrical magnetic element to apply a magnetic bias to said element in the hard axis longitudinal direction,
means to propagate a mechanical sonic stress wave along said magnetic element,
means synchronized with the time position of said stress wave and including an axial conductor in said cylindrical magnetic element to apply write "1" or write "0" magnetic field pulses of polarities opposite from each other in the transverse easy axis direction to said magnetic element, said magnetic field pulses having an amplitude in relation to said magnetic bias to cause switching of flux to an easy axis direction solely at a bit storage location region which is concurrently stressed by said stress wave, and
sense means including an axial conductor in said cylindrical magnetic element and a sense amplifier to sense magnetic field changes in the transverse easy axis direction due to the presence of stored information in the successive storage location regions of the magnetic element during the subsequent propagation of a mechanical sonic wave along said magnetic element.

References Cited

UNITED STATES PATENTS

| | | | |
|---|---|---|---|
| 3,129,412 | 4/1964 | Lovell | 340—174 |
| 3,154,767 | 10/1964 | Shook | 340—174 |
| 3,212,069 | 10/1965 | Tellerman | 340—174 |
| 3,264,619 | 8/1966 | Riseman | 340—174 |

FOREIGN PATENTS

| | | |
|---|---|---|
| 873,367 | 7/1961 | Great Britain. |

BERNARD KONICK, *Primary Examiner.*

M. S. GITTES, *Assistant Examiner.*